US010146072B2

(12) United States Patent
Zheng et al.

(10) Patent No.: US 10,146,072 B2
(45) Date of Patent: Dec. 4, 2018

(54) DEVICE FOR REDUCING RESIDUAL AMPLITUDE MODULATION

(71) Applicant: Shanxi University, Taiyuan (CN)

(72) Inventors: Yaohui Zheng, Taiyuan (CN); Xiaocong Sun, Taiyuan (CN); Yajun Wang, Taiyuan (CN); Kunchi Peng, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 0 days.

(21) Appl. No.: 15/494,567

(22) Filed: Apr. 24, 2017

(65) Prior Publication Data

US 2018/0307064 A1 Oct. 25, 2018

(51) Int. Cl.
  *G02F 1/01* (2006.01)
  *G02F 1/09* (2006.01)
  *G02F 1/03* (2006.01)

(52) U.S. Cl.
  CPC .......... *G02F 1/0305* (2013.01); *G02F 1/0327* (2013.01); *G02F 2202/20* (2013.01); *G02F 2203/50* (2013.01)

(58) Field of Classification Search
  CPC ...... G02F 1/093; G02F 1/3534; G02F 1/3544; G02F 1/13471; G02F 1/0322; G02F 1/133634; G02F 1/1337; G02F 1/35; G02F 1/3532; G02F 1/37; G02F 2001/3503; G02F 2001/3507; G02F 2201/50; G02F 2413/02; G02F 2413/08; G02F 2413/13; G02B 6/2746; G02B 5/3083; G02B 13/0075; G02B 5/005; G02B 6/4214

USPC ....... 359/237, 276, 279, 286, 290–292, 298, 359/316–318, 322
See application file for complete search history.

(56) References Cited

U.S. PATENT DOCUMENTS

| 5,414,541 A * | 5/1995 | Patel ................... G02F 1/13471 349/133 |
| 2002/0101629 A1* | 8/2002 | Suganuma ............... G03H 1/26 359/35 |
| 2011/0116018 A1* | 5/2011 | Kato ................... G02F 1/13473 349/78 |

* cited by examiner

*Primary Examiner* — Brandi Thomas
(74) *Attorney, Agent, or Firm* — Gokalp Bayramoglu

(57) ABSTRACT

The present disclosure provides a device for reducing residual amplitude modulation. The device includes an electro-optic modulation device with three crystals connected in series. The three crystals are the first cubic crystal, an intermediate crystal, and the second cubic crystal respectively. The intermediate crystal is an electro-optic modulating crystal. The intermediate crystal is connected to the high-frequency signal source module. The specification of the intermediate crystal is X mm×Y mm×d mm. The first cubic crystal and the second cubic crystal is connected to both ends of the intermediate crystal in series along the direction of the X axis. The relative dielectric constant of the first cubic crystal and the relative dielectric constant of the second cubic crystal both are equal to the relative dielectric constant of the intermediate crystal. The specification of the first cubic crystal and the specification of the second cubic crystal both are d/2 mm×Y mm×d mm.

4 Claims, 3 Drawing Sheets

DEVICE FOR REDUCING RESIDUAL AMPLITUDE MODULATION

TECHNICAL FIELD

The present disclosure relates to modulation technique, particularly an electro-optic modulation device.

BACKGROUND

Squeezed state light field is an important quantum resource in the aspect of gravitational wave detection, optical precise measurement, quantum information, etc. In the experiment preparation system of the squeezed state light field, the performance of the servo-control system is the key technique to obtain the squeezed state light field with high performance. However, in the feedback control system based on the electro-optic phase modulation, the introduction of the residual amplitude modulation during the process of the electro-optic phase modulation, so that the zero baseline of error signals of PDH locked by sideband frequencies drifts with time to influence the performance of the feedback control system, is inevitable. The frequency detuning of the OPO (optical parametric oscillator) cavity will cause compression angle rotation, and the drift of phase lock point will cause the anti-compression component to mix into the compression component, which is adverse for lowering the noise of quantum.

In the PDH locking system, the electro-optic phase modulator is widely used as an optical modulator. Due to the electro-optic effect of electro-optic crystal, the distribution of the refractive index in each direction of the electro-optic crystal will change, the phase of the optical wave can be modulated by the electro-optic phase modulator. The characteristics of equal amplitude and opposite phase of the two modulated side bands are used to obtain the spectral line of the frequency discrimination signal, so as to lock the optical cavity length and the relative phase in the central zero crossing point to realize the stability of the optical cavity length and the relative phase. It is found from the experiment that after the laser is electro-optic phase modulated, the phase modulation and the residual amplitude modulation (RAM) are generated at the same time, showing that the positive and negative first side bands of the modulated light are not of exactly equal amplitude and opposite phase. Moreover, the asymmetry of the side band will change when the environment and experimental conditions change. In the locking system, theoretical calculation and experimental results show that the existence of the residual amplitude modulation will cause the central zero point of the spectral line as the frequency discrimination signal to shift, so that the accuracy of controlling and locking is affected, leading to certain errors of the optical cavity and the lock point of the relative phase due to the existence of the residual amplitude modulation. The drift of locked loop is increased under the influence of the residual amplitude modulation, which is adverse for the stable running of the system. Besides, in the precise control of the light field, theoretical calculation and experimental results show that the existence of the residual amplitude modulation will cause the central zero point of the spectral line of the frequency discrimination signal to shift, so as to affect the accuracy of measuring and controlling. In the precision laser spectrum, the fitting of the spectral line of the molecular light spectrum will generate a certain error because of the existence of the residual amplitude modulation. The drift of frequency locked loop is increased under the influence of the residual amplitude modulation, which is adverse for the stable running of the system. With the improvement of the experimental conditions and the further improvement of the experimental requirements, the influence caused by the residual amplitude modulation has been paid more and more attention.

The main reasons causing the residual amplitude modulation are the birefringence effect, the etalon effect, the non-uniform distribution of the electric field, the radio-frequency power jitter, the laser frequency jitter, etc. The present invention mainly focuses on theoretical and experimental research on reducing the residual amplitude modulation in phase modulation and mainly studies the influence of the electric field distribution of the electro-optic modulated crystal on the residual amplitude modulation. The influence range of the edge effect of the electro-optic modulated crystal is calculated and the volume of the uniform electric field of the electro-optic modulated crystal is enlarged. A device for reducing residual amplitude modulation is provided, which includes an electro-optic modulation crystal, a high-frequency signal source module. The laser passed through the combined modulated crystal, which is connected to the high-frequency signal source. The high-frequency signal source transmits a sine wave signal, causing the phase modulated laser to generate the modulated light. Therefore, the laser passes through the uniform electric field of the electro-optic modulated to reduce the residual amplitude modulation, so as to improve the performance of the feedback control system, which is beneficial for obtaining a squeezed state light field with high compression degree and stable operation.

The research in the prior art shows that the main reasons causing the residual amplitude modulation are the birefringence effect and the etalon effect of the crystal. Most of the prior arts suppress the residual amplitude modulation by altering the voltage applied to the electro-optic crystal so as to change the distribution internal electric field of crystal. Actually, the crystal itself affects the internal electric field. However, the influence of the electric field distribution of the electro-optic crystal itself on the residual amplitude modulation has not been considered before.

SUMMARY OF THE INVENTION

The present invention mainly focuses on theoretical and experimental research on reducing the residual amplitude modulation in phase modulation and mainly studies the influence of the electric field distribution of the electro-optic modulated crystal on the residual amplitude modulation. The influential range of the edge effect of the electro-optic modulated crystal is calculated and the volume of the uniform electric field of the electro-optic modulated crystal is enlarged. A device for reducing residual amplitude modulation is provided. As such, the laser passes through the uniform electric field of the electro-optic modulated crystal as much as possible to reduce the residual amplitude modulation, so as to improve the performance of the feedback control system, which is beneficial for obtaining squeezed state light field with high compression degree and stable operation.

The above problems are solved by the present disclosure through the technical solutions as below:

A device for reducing residual amplitude modulation, wherein an incident light is paralleled to Y axis and a direction of an externally applied electric field is paralleled to d axis. A modulated light is an outgoing light, wherein a direction of the outgoing light is paralleled to Y axis. The device includes a high-frequency signal source module, characterized in that, further comprising an electro-optic modulation device with three crystals connected in series. The electro-optic modulation device with three crystals connected in series includes three crystals connected in series. The three crystals include the first cubic crystal, an intermediate crystal, the second cubic crystal respectively. The intermediate crystal is an electro-optic modulating crystal. The intermediate crystal is connected to the high-frequency signal source module. The specification of the intermediate crystal is X mm×Y mm×d mm. The first cubic crystal and the second cubic crystal are connected to both ends of the intermediate crystal in series along a direction of X axis. The relative dielectric constant of the first cubic crystal and the relative dielectric constant of the second cubic crystal both are equal to a relative dielectric constant of the intermediate crystal. The specification of first cubic crystal and the specification of the second cubic crystal both are d/2 mm×Y mm×d mm.

Further, the intermediate crystal is lithium niobate crystal. The relative dielectric constant of the first cubic crystal and the relative dielectric constant of the second cubic crystal is 50.

Further, the specification of the intermediate crystal is 4 mm×40 mm×3 mm. The specification of first cubic crystal and the specification of the second cubic crystal both are 1.5 mm×40 mm×3 mm.

DETAILED DESCRIPTION OF THE INVENTION

The present disclosure is further illustrated with the following embodiments, but the present disclosure is not limited to those embodiments.

Figure 1:
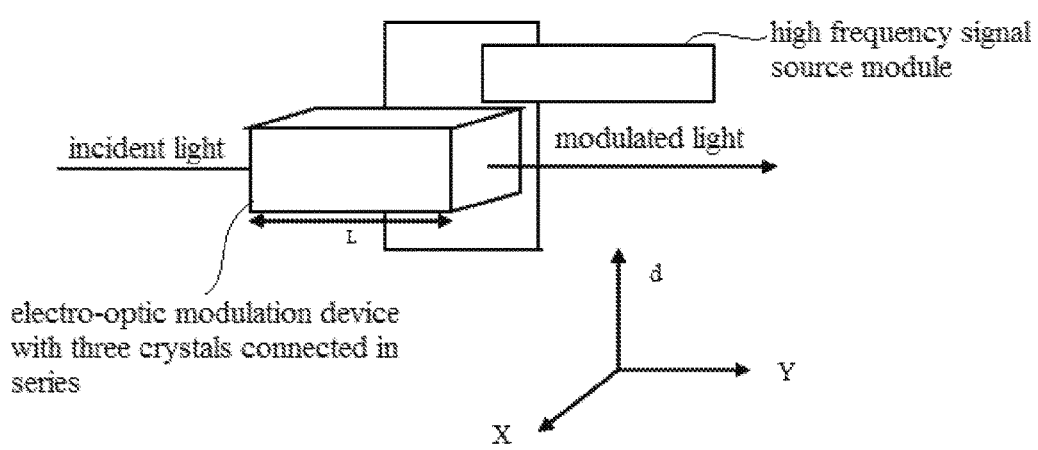
FIG. 1 is a simple structural diagram of a device for reducing residual amplitude modulation of the present disclosure.

FIG. 1 is a simple structural diagram of a device for reducing residual amplitude modulation. The laser passes through the electro-optic modulation device with three crystals connected in series. The electro-optic modulation device is connected to the high-frequency signal source. The high-frequency signal source transmits a sine wave signal, causing the phase modulated laser to generate two side bands with equal amplitude and opposite phase, so as to obtain the spectral line of the frequency discrimination signal, so as to lock the optical cavity length and the relative phase in the central zero crossing point to realize the stability of the optical cavity length and the relative phase. However, it is found from the experiment that after the laser is electro-optic phase modulated, the phase modulation and the residual amplitude modulation (RAM) are generated at the same time, showing that the positive and negative first side bands of the modulated light does not have exactly equal amplitude and opposite phase. The existence of the residual amplitude modulation will cause the central zero point of the spectral line of the frequency discrimination signal to shift, so that the accuracy of controlling and locking is affected, leading to certain errors of the optical cavity and the lock point of the relative phase due to the existence of the residual amplitude modulation.

When an external electric field is applied to the electro-optic crystal, the electro-optic crystal can be regarded as a finite square parallel-plate capacitor. The plate specification of the electro-optic phase modulated crystal usually used in the lab is 4 mm×40 mm×3 mm, (i.e., the area of upper and lower plate is 4 mm×40 mm, and the gap between the two plates is 3 mm). Under such conditions, the range of the edge effect will be large. When the incident laser passes through the non-uniform electric field of the electro-optic crystal, linear distortion is inevitably caused, and the residual amplitude modulation is generated.

First, the influential range of the edge effect in electro-optic phase modulated crystal is calculated by applying the Schwarz-Christopher transformation.

Figure 2:
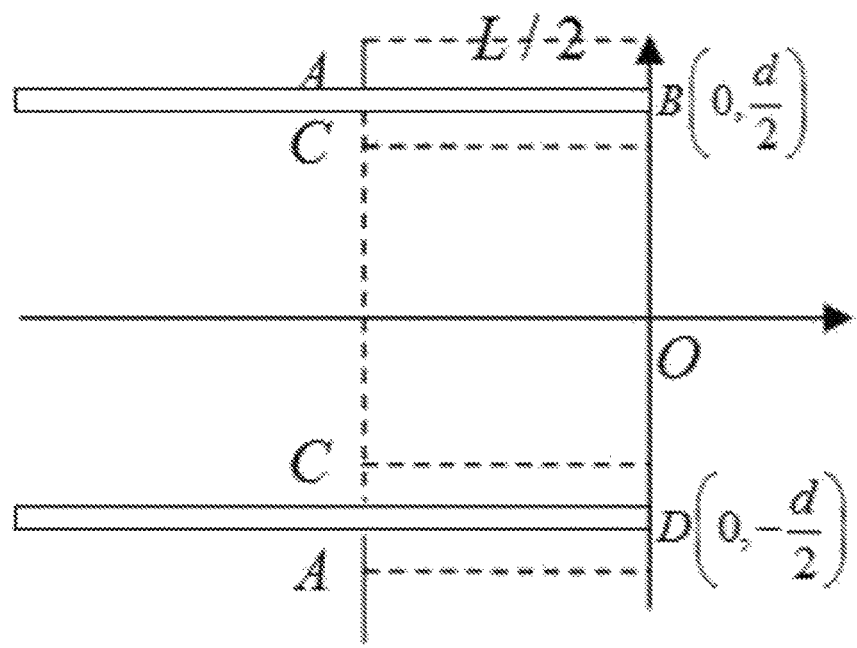
FIG. 2 is a sectional view of the half "infinite" square parallel-plate capacitor on the Xd plane of the intermediate crystal of the present disclosure.

Considering the square parallel-plate capacitor on Xd cross section, the electric charge on the plate is bilaterally symmetrically distributed, and thus merely the electric charge distribution on half of the plate needs to be analyzed. With the middle point of the lower plate on Xd cross section as an origin, a new XY rectangular coordinate system is set up. In order to obtain the edge effect of one side of the "infinite" parallel-plate capacitor, the side is located at x=0 and the middle point of the plate is located at x=−∞. Provided that the upper plate of the capacitor is located at $$y = \frac{d}{2},$$

and the electric potential is $V_0$. The lower plate is located at $$y = -\frac{d}{2},$$

and the electric potential is $-V_0$. The definition domain is −∞<x≤0 (as shown in FIG. 2). The coordinates of any point on the plate all can be indicated by two-dimensional complex plane (z plane), z=x+iy. The electric field spaces of two half plate capacitors with "infinite length" and "semi-infinite width" can be viewed as "quadrilateral" ABCDA represented by dashed lines. The dashed line AB coincides with the dashed line BC to be the upper plate of the capacitor, and the dashed line CD coincides with the dashed line DA to be the lower plate of the capacitor. The electric potential V on the plates must meet the Laplace Equation. A complex number W is provided by a complex function. The electric potential V can be regarded as the imaginary part of the analytic function W=u+iv=f(z). In the formula, z=x+iy.

The deflection angles on top points B, C, and D are −π, +π, −π respectively. The transformation relation from the z plane to the ζ plane can be obtained from the Schwarz-Christopher transformation:

$$z = (e^\varsigma + \varsigma + 1)\frac{d}{2\pi}, \quad (1)$$

Electric potential V of the electrostatic field of the parallel-plate capacitor in $\zeta$ plane is $$V = \frac{V_0}{\pi} = \text{Im}\left(\frac{V_0}{\pi}\varsigma\right),$$

that is, electric potential V can be regarded as the imaginary part of the analytic function W, $$W = u + iv = \frac{V_0}{\pi}\varsigma,$$

which is plugged into formula (1) to obtain:

$$z = \frac{d}{2\pi}\left(e^{\frac{\pi}{V_0}W} + \frac{\pi}{V_0}W + 1\right), \quad (2)$$

The real part and imaginary part of the formula respectively are:

$$\begin{cases} x = \frac{d}{2\pi}\left(e^{\frac{\pi}{V_0}u}\cos\frac{\pi}{V_0}v + \frac{\pi}{V_0}v + 1\right) \\ y = \frac{d}{2\pi}\left(e^{\frac{\pi}{V_0}u}\sin\frac{\pi}{V_0}v + \frac{\pi}{V_0}v\right) \end{cases}, \quad (3)$$

Considering the intensity of the electric field $\overset{1}{E}$, that is, $$E = \sqrt{E_x^2 + E_y^2} = \sqrt{\left(-\frac{\partial v}{\partial x}\right)^2 + \left(-\frac{\partial v}{\partial y}\right)^2}$$

Since $$\frac{dW}{dz} = \frac{\partial u}{\partial x} + i\frac{\partial v}{\partial x},$$

from the Cauchy-Riemann Equation $$\frac{\partial u}{\partial x} = \frac{\partial v}{\partial y}$$

to obtain $$\frac{dW}{dz} = \frac{\partial v}{\partial y} + i\frac{\partial v}{\partial x}.$$

Therefore, $$E = 1 \Big/ \left|\frac{dz}{dW}\right| = \frac{1}{\left|1 + e^{\frac{\pi}{V_0}W}\right|} \frac{2V_0}{d}.$$

W=u+iv is plugged into the formula above to obtain:

$$E = \frac{2V_0}{d}\left(e^{\frac{2\pi}{V_0}u} + 2e^{\frac{\pi}{V_0}u}\cos\frac{\pi}{V_0}v + 1\right)^{-\frac{1}{2}} \quad (4)$$

It can be known from the formula (3) that when the internal surface from C→B, u→−0, and the internal surface from A→B, u→+0, the edge effect mainly occurs near the edge. Thus, the absolute value of u is very small. Therefore, in $$e^{\frac{2\pi}{V_0}u} = 1 + \frac{\pi}{V_0}u + \frac{1}{2}\frac{\pi^2}{V_0^2}u^2 + L$$

only up to the third item is taken, to plug into formula (3), to obtain.

$$\frac{2\pi}{d}x = -\frac{1}{2}\frac{\pi^2}{V_0^2}u^2$$

Since x itself is negative, thereby:

$$u = \pm\frac{2V_0}{\sqrt{\pi}}\sqrt{\frac{x}{d}} \quad (5)$$

Next, only the absolute value of x is considered, i.e. only the distance from the edge is considered. The formula (5) is plugged into the formula (4) to obtain the distribution of the intensity of the internal, external surface electric field of the upper plate respectively. Providing that $$E_0 = \frac{2V_0}{d}$$

is the distribution of the electric field intensity between the plates of the parallel-plate capacitor when the edge effect is ignored, that is:

$$E_{internal} = \frac{E_0}{1 - e^{-2\sqrt{\pi}\sqrt{\frac{x}{d}}}}, \quad E_{external} = \frac{E_0}{1 - e^{2\sqrt{\pi}\sqrt{\frac{x}{d}}}}$$

In the formula, x is the distance from the target point to the edge, and d is the gap between the two plates.

It can be seen that in the deep of the capacitor, when $x \to \infty$, $\sigma_{internal} \to \sigma_0$, $\sigma_{external} \to 0$; and near B point, i.e., when $x \to 0$, $\sigma_{internal}$, $\sigma_{external} \to \infty$. Data can be obtained through the formula (7):

Table 1 the typical data near the internal and external surfaces

| x/d | 0 | 0.0001 | 0.01 | 0.5 | 1.0 | 2.0 | 4.0 |
|---|---|---|---|---|---|---|---|
| $E_{internal}/E_0$ | ∞ | 28.7124 | 3.350 | 1.08878 | 1.0297 | 1.0067 | 1.00083 |
| $E_{external}/E_0$ | ∞ | 27.7124 | 2.350 | 0.0888 | 0.0297 | 0.00669 | 0.000834 |

From the table, when x/d=0.5, the edge effect is not significant.

Figure 3:
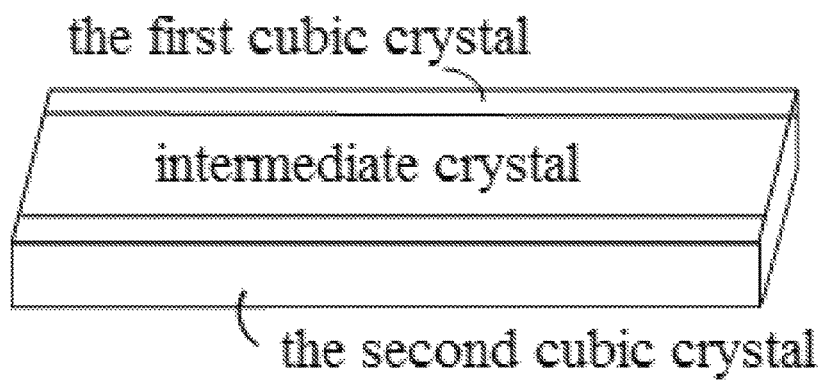
FIG. 3 is a structural diagram of the electro-optic modulation device with three crystals connected in series of the present disclosure.

Thus, in the electro-optic phase modulator, in order to reduce the influence of non-uniform electric field on the residual amplitude modulation, the size of crystal need to be changed. However, enlarging the size of the electro-optic modulated crystal will lead to material waste, the increase of product cost and other adverse effects. In order to reduce the cost, the cubic crystals are added at both ends of the electro-optic modulated crystal. The cubic crystal has a relative dielectric constant of 50, which is the same as that of the relative dielectric constant of the lithium niobate crystal. As such, the electro-optic crystal in the middle just occupies the range of the uniform electric field. The added material occupies the influential range of the edge effect. When the fitting of the two is under the ideal condition, once the incident laser comes into the externally applied electric field, is the laser definitely passes through a uniform electric field, so that the residual amplitude modulation is reduced. Since 40 mm along Y direction of the electro-optic phase modulator in the lab is far greater than the gap d which is 3 mm, the edge effect is small. In order to facilitate the laser passing through the electro-optic modulated crystal, no material can be added. Furthermore, 4 mm of X axis is close to the gap d which is 3 mm. In order to eliminate the edge effect, from the above theoretical calculation, the present disclosure should use the structure of "three-crystal connected in series". As shown in FIG. 3, the whole size of the combined crystal is 7×40×3 mm. The intermediate crystal is lithium niobate crystal, which has a size of 4×40×3 mm. The cubic crystals are added on both ends and have a size of 1.5×40×3 mm. Then, the interior of the electro-optic crystal has a uniform electric field, so that the residual amplitude modulation is reduced and the performance of the feedback system is improved, which is beneficial for obtaining a squeezed state light field with high compression degree and stable operation.

What is claimed is:

1. A device for reducing residual amplitude modulation, comprising
a high-frequency signal source module; and
an electro-optic modulation device with three crystals connected in series, wherein the electro-optic modulation device with three crystals connected in series includes three crystals connected in series, and wherein the three crystals are a first cubic crystal, an intermediate crystal, and a second cubic crystal respectively;
wherein
the intermediate crystal is an electro-optic modulating crystal;
the intermediate crystal is connected to the high-frequency signal source module;
the first cubic crystal is connected to a first end of the intermediate crystal and the second cubic crystal is connected to a second end of the intermediate crystal, a series connection direction of the first cubic crystal, the intermediate crystal and the second cubic crystal is perpendicular to an incident light direction, and a length of each of the first cubic crystal, the intermediate crystal and the second cubic crystal along the incident light direction is greater than the width thereof;
a relative dielectric constant of the first cubic crystal and a relative dielectric constant of the second cubic crystal both are equal to a relative dielectric constant of the intermediate crystal;
wherein the size of the first cubic crystal is equal to the size of the second cubic crystal, and the length of the first cubic crystal is equal to the length of the intermediate crystal, the height of the first cubic crystal is equal to the height of the intermediate crystal, while the width of the first cubic crystal is equal to half of the height of the intermediate crystal.

2. The device for reducing residual amplitude modulation according to claim 1, wherein the intermediate crystal is lithium niobate crystal, the relative dielectric constant of the first cubic crystal and the relative dielectric constant of the second cubic crystal both are 50.

3. The device for reducing residual amplitude modulation according to claim 1, wherein the dimensions of the intermediate crystal are 4 mm×40 mm×3 mm; the dimensions of first cubic crystal and the dimensions of the second cubic crystal both are 1.5 mm×40 mm×3 mm.

4. The device for reducing residual amplitude modulation according to claim 1, wherein
a direction of an externally applied electric field is vertically perpendicular to the incident light direction;
a modulated light is an outgoing light; and
a direction of the outgoing light is paralleled to the incident light direction.

* * * * *